3,676,264
SHORTENED APPARATUS FOR PRODUCING CORRUGATED BOARD
Lawrence J. Saunders, Elmont, N.Y., assignor to S & S Corrugated Paper Machinery Co., Inc., Brooklyn, N.Y.
Continuation-in-part of application Ser. No. 692,529, Dec. 21, 1967. This application Nov. 26, 1969, Ser. No. 880,307
Int. Cl. B31f 1/20
U.S. Cl. 156—470                             11 Claims

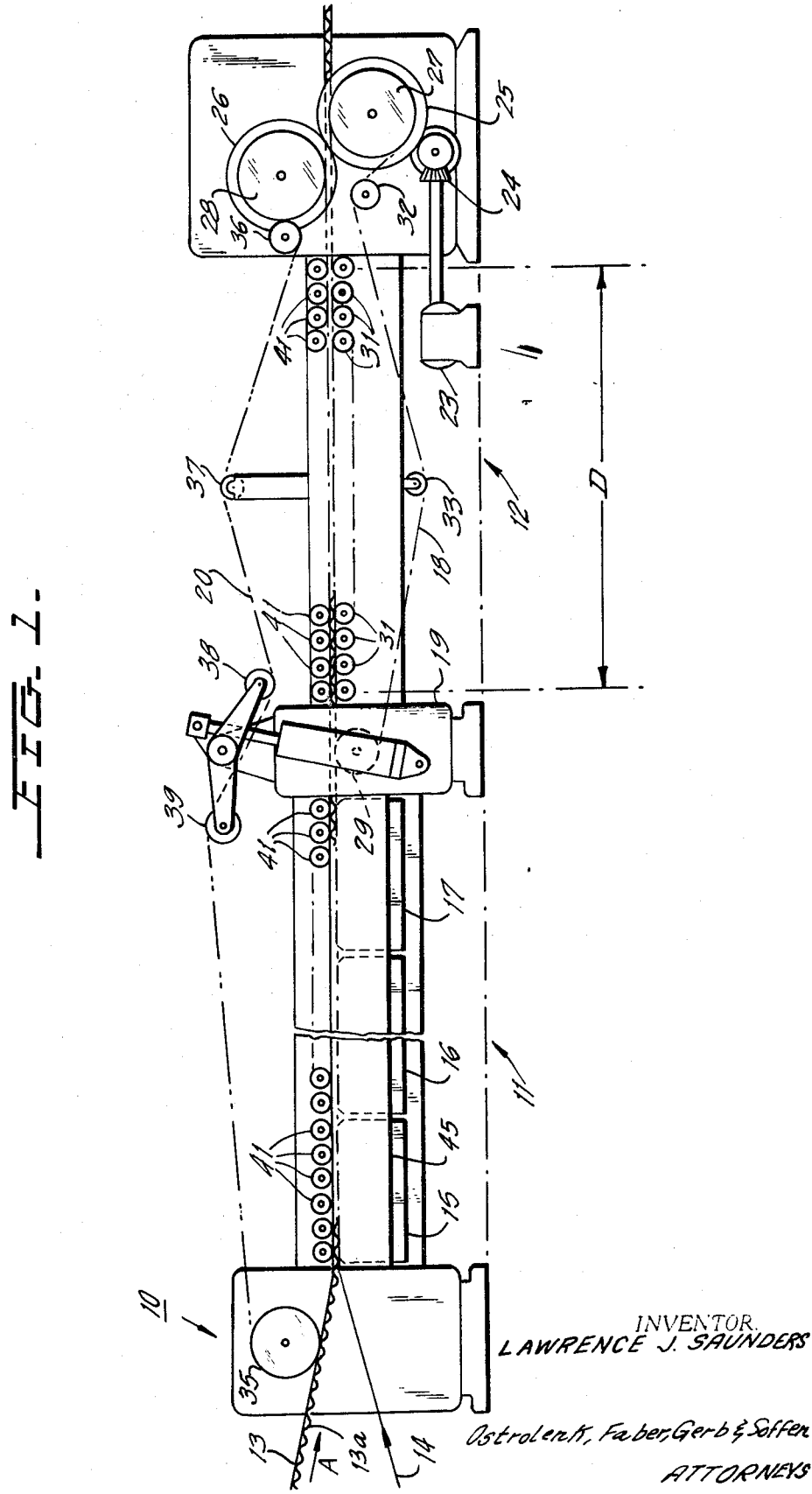

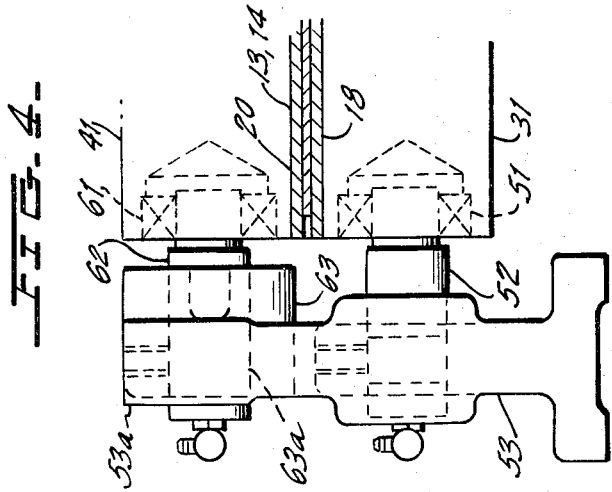
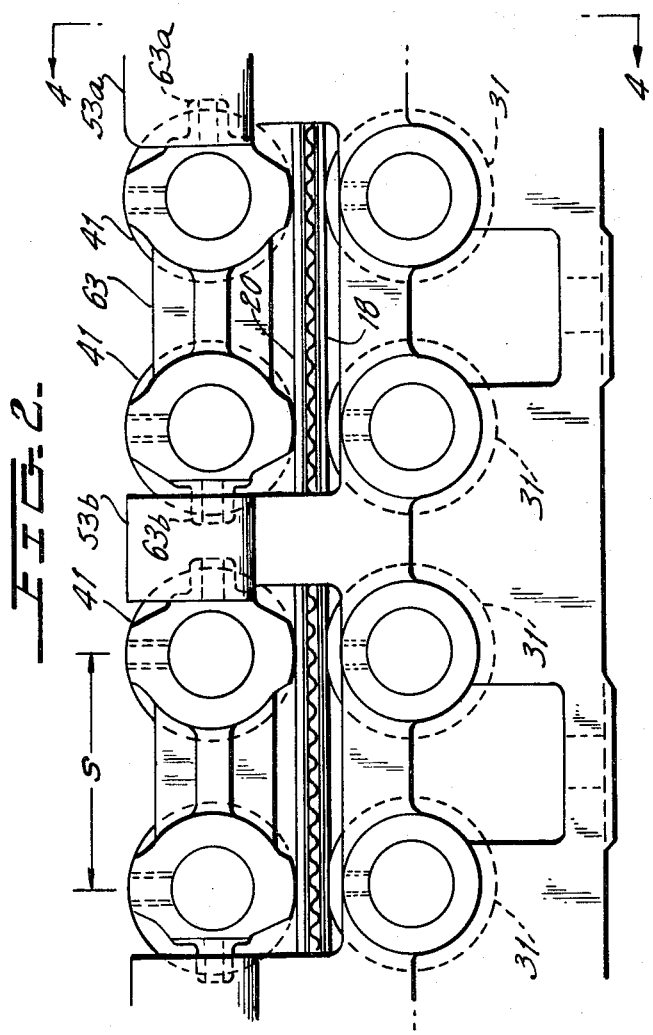
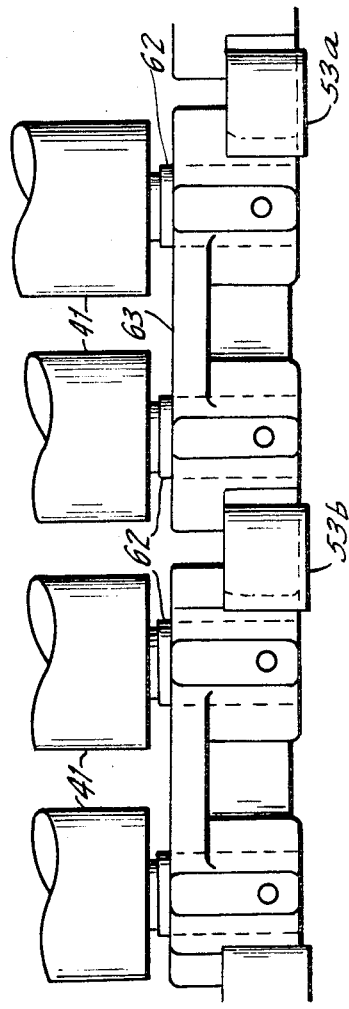

ABSTRACT OF THE DISCLOSURE

The length of a machine for producing corrugated board is substantially reduced by shortening the heating section where the glue gels and/or the pulling section which receives the corrugated board web after it passes through the heating section. Shortening of the heating and/or pulling sections is achieved by constructing the rollers providing the loading on the upper conveyor belt common to both the heating and pulling sections with diameters within the range of 1½" to 3" and positioning these rollers with spacings between centers that are, on average, 1.1 to 1.3 times roll diameter for steel rollers in the range of 80" to 105" in length.

---

This application is a continuation-in-part of copending application Ser. No. 692,529 filed Dec. 21, 1967, now Pat. No. 3,560,304.

This invention relates to apparatus for producing corrugated board and more particularly relates to apparatus of this type in which the heating and/or pulling sections are particularly short.

Apparatus for producing corrugated board is in the order of 200–300 feet long and is usually the longest piece of equipment in a box plant. In many instances this great length dictates one of the minimum dimensions for the plant building. It becomes highly desirable to shorten such apparatus in metropolitan areas, where land values are extremely high, since the enormous size of such apparatus is a substantial factor in the high cost of building and maintaining a box plant.

An additional important reason for desiring to shorten the length of such apparatus is that in more recent years there has developed a series of new attachments, such as automatic takeoff tables, that may be used in conjunction with such apparatus to improve plant efficiency. However, in many instances these new attachments cannot be used since they will increase the length of the corrugating apparatus, and without the attachments such apparatus may run the full length of the box plant and expansion of the building may be impossible.

With this in mind the instant invention provides corrugating apparatus in which for a machine 87" wide, the conventional heating section length of 36 feet to 42 feet is reduced to the range of 8 feet to 14 feet, and pulling section length of 30 feet to 42 feet is reduced to the range of 7 feet to 12 feet, both without adversely affecting the quality of board produced.

In order to obtain a more frequent application of heat transferring force and bonding force below the crushing value, it is necessary to reduce the diameters of the pressure rolls, but as roll diameter is reduced peripheral speed thereof becomes excessive and the rolls do not efficiently perform their intended function of biasing the upper conveyor against the board. In addition, as machine width increases, if weight roll diameter is reduced there comes a point where roll rigidity is lost and the rolls begin to whip.

Traditionally, the weight rollers in the heating and pulling sections have been placed a considerable distance apart, to insure proper gelatinizing of the glue and curing of the board as it traverses the corrugator. Further, the prior art deemed it necessary to provide a relatively long heating section for transfer of sufficient heat from the steam tables in order to gel the glue. It has been found that closely spacing the pressure points does not adversely affect board quality. In another area, traditional thinking with respect to construction of pulling sections was that substantial cooling of the board must take place therein. It has been found that board characteristics will not be adversely affected if only a relatively small amount of cooling takes place in the pulling section, it being sufficient if additional cooling takes place as the board passes from the pulling section through the slitter.

Thus, disregarding traditional concepts, the instant invention provides a corrugator in which the heating and pulling sections have solid steel weight rollers 80" to 105" long and 1½" to 3" in diameter arranged in an array 7 feet to 14 feet in length with the center-to-center distances between rollers centers being, on average, 1.1 to 1.3 times roll doameter.

Accordingly, the primary object of the instant invention is to provide novel apparatus for producing corrugated board which is significantly shorter than similar apparatus provided by the prior art.

Another object is to provide novel apparatus for producing corrugated board in which the heating and/or pulling sections are of reduced length, being in the order of one-third the length of prior art heating and pulling sections.

Still another object is to provide heating and/or pulling sections in which the weight rollers are on centers spaced, on average, 1.1 to 1.3 times the diameter of the weight rolls.

These as well as other objects of this invention will become readily apparent after reading the following description of the accompanying drawings in which:

FIG. 1 is a side elevation showing the general form of a double backer machine constructed in accordance with the teachings of the instant invention.

FIG. 2 is an enlarged fragmentary side elevation of a portion of FIG. 1 illustrating the mounting of the pressure rolls acting on the lower flight of the upper belt common to both the heating and pulling sections.

FIG. 3 is a fragmentary plan view of the illustration seen in FIG. 2.

FIG. 4 is a fragmentary end view looking in the direction of arrows 4—4 of FIG. 2.

Now referring to the figures and more particularly to FIG. 1 showing double backer 10 which is a section of apparatus for producing corrugated board, such apparatus also including so-called slitters and cutoffs (not shown). Double backer 10 includes heating section 11 at the infeed end thereof and pulling section 12 at the outfeed end thereof. Single faced corrugated web 13 is fed in the direction indicated by arrow A and meets backing web 14 which is joined in face-to-face relation to the corrugated layer of single faced web 13 by a starch adhesive or glue on the lower crowns of the corrugated layer 13a. In heating section 11, composite web or double faced board 13, 14 is supported from below by a series of steam chests 15–17 having coplanar upper horizontal surfaces. Longitudinally extending frame members 45 on opposite sides of double backer 10 fixedly support steam chests 15–17. Heat emitted from steam chests 15–17 and transferred to composite web 13, 14 serves principally to gel the glue and drive off excess moisture in the web material.

From heating section 11 composite web 13, 14 passes into pulling section 12, where the upper flight of continuously moving lower conveyor belt 18 provides a lower support for composite web 13, 14. Web 13, 14 is pulled through double backer 10 by virtue of the fact that web 13, 14 is sandwiched between the upper flight of belt 18 and the section of the lower flight of continuous moving upper conveyor belt 20 in pulling section 12. Belt 18 extends for only the length of pulling section 12, while belt 20 extends over the combined lengths of heating section 11 and pulling section 12. Driving power for belts 18 and 20 is provided by variable speed motor 23 acting through bevel gear means 24, as well as through gears 25 and 26, to rotate pull rolls 27, 28. The upper flight of belt 18 is horizontal and extends between idler 29 and pull roll 27, being supported therebetween by a plurality of idlers 31, 31, etc. The lower flight of belt 18 passes above idler 32 and below idler 33.

The lower flight of upper belt 20 is horizontal through most of the length thereof and extends from idler 35 at the infeed end of heating section 11 to pull roll 28 at the outfeed end. The upper flight of belt 20 is guided by idlers 36, 37 as well as idlers 38, 39 of fluid actuated tensioning means 19. In heating section 11 the lower flight of belt 20 supports a plurality of idler rolls 41, which exert a downward pressure to maintain web 13, 14 in intimate heat transferring contact with the upper surfaces of steam chests 15–17. In pulling section 12 the lower flight of belt 20 supports idler rolls 41 which exert a downward pressure thereon, with each of the rollers 41 being positioned so that its longitudinal axis is in a vertical plane passing through the center of one of the idler rollers 31.

As best seen in FIG. 4, each idler roller 31 is provided with a recess which houses bearing 51 rotatably mounting roller 31 to stub shaft 52 extending inwardly from stationary frame member 53. Similarly, each end of each of the idler rollers 41 is provided with a recess which houses bearing means 61. Each bearing 61 rotatably supports roller 41 on stub shaft 62 extending inwardly from bracket 63. As best seen in FIG. 2, each bracket 63 directly supports two rollers 41, 41. End portions 63a, 63b of bracket 63 extend into recesses in spaced upward extensions 53a, 53b of frame member 53 to establish the longitudinal poistion of bracket 63.

In accordance with the instant invention, the spacing between adjacent rollers 41 in both the heating and pulling sections 11, 12 is, on average, in the range of 1.1 to 1.3 times the outer diameter of rollers 41. Rollers 41 are typically constructed of solid steel, and are in the range of 70" to 120" long with diameters in the range of 1½" to 3". With rollers 41 of this construction and spacing, sufficient pulling force is developed in section 12 without crushing composite web 13, 14 by utilizing an array of rollers 41 in the range of 7 feet to 12 feet, this dimension being indicated in FIG. 1 by the letter D. Typically, rollers 41 in heating section 11 form an array extending for from 8 to 14 feet in length.

It is noted that the pulling force developed by belts 18, 20 acting on composite web 13, 14 must also feed the composite web 13, 14 into the slitter (not shown) and into the cutoff knives (not shown). A uniform rate of feeding between the cutoff knives is extremely important if sheet length accuracy is to be maintained, so that slippage between web 13, 14 and belts 18, 20 must be kept at a minimum.

An actual machine built in accordance with the teachings of the instant invention has been constructed with a 12 foot array of 87" long and 2½" diameter rollers spaced 3" apart center-to-center in the pulling section. Such a pulling section perform on a par with a prior art machine having a 42 foot array of 87" long and 2½" diameter rollers spaced 10" apart center-to-center. A heating section has been constructed in accordance with this invention, having a 12 foot array of 87" long and 2½" diameter rollers spaced apart, on average, 1.175 times roller diameter. Such a heating section performs on a par with a prior art machine having a 36 foot array of 87" long and 2½" diameter rollers spaced 12" apart, center-to-center.

While both heating and pulling sections 11, 12 have been illustrated as being relatively short by being constructed in accordance with teachings of the instant invention, it is noted that for some purposes (i.e., a renovated machine) it is sufficient that only the heating or the pulling section be made relatively short.

It is also noted that the spacing between pressure rollers 41 need not be uniform. That is, a machine has been built in which each bracket 63 supported rollers with a center-to-center spacing of 1.05 times roller diameter, and the center-to-center spacing between adjacent rollers mounted on different brackets 63 was 1.3 times roller diameter, resulting in an average center-to-center spacing between rollers being 1.175 times roller diameter.

While upper belt 20 is shown as extending across both heating and pulling sections 11 and 12, it is noted that upper belt 20 need not extend over heating section 11, in which event rollers 41 of heating section 11 will press directly upon composite web 13, 14. This modified structure permits moisture to be driven off more rapidly than in the case of the conventional upper belt 20 extending over heating section 11.

Thus, it is seen that the instant invention provides relatively short heating and pulling sections for corrugating apparatus by utilizing closely spaced pressure rollers in an array extending for probably no more than one third the longitudinal distance of the pressure roller array in the double backers of the prior art.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. Apparatus for producing corrugated board, said apparatus including a corrugating section for gluing at least one liner to a corrugated medium to produce a continuous web of corrugated board, a heating section including a portion providing a generally horizontal support for said web as it issues from said corrugating section, a pulling section to receive said web as it issues from said heating section and for drawing said web across said support, said pulling section including upper and lower continuous moving conveyor belt means, said lower belt means having a generally horizontal upper flight portion, said upper continuous moving conveyor belt means having generally horizontal lower flight portions positioned above said upper flight portion and said horizontal support, downwardly acting weight means urging said lower flight portion into firm pressure engagement with said web and urging said web against said horizontal support, said weight means including a plurality of parallel elongated rollers in said heating section, means rotatably mounting each of said rollers on an individual horizontal axis extending transverse to direction of web movement and through the longitudinal axis of each roller, said rollers being positioned with spacing, on average, between longitudinal axes of adjacent ones of said rollers being in the range of 1.1 to 1.3 times the outer diameter of said adjacent ones of said rollers.

2. Apparatus as set forth in claim 1, in which the diameters of said rollers are in the range of 1½ to 3 inches.

3. Apparatus as set forth in claim 2, in which the number of rollers in said plurality of rollers is in the range of 28 to 50.

4. Apparatus as set forth in claim 3, in which said rollers are in the range of 80 to 105 inches long.

5. Apparatus as set forth in claim 4, in which said rollers are constructed of steel.

6. Apparatus as set forth in claim 1, in which some of said rollers are positioned with center-to-center spacing between longitudinal axes of as little as 1.05 times roller diameter.

7. Apparatus as set forth in claim 1, in which the weight means includes another plurality of parallel elongated rollers in the other of said heating and said pulling sections, means rotatably mounting each roller of said another plurality of rollers on an individual horizontal axis extending transverse to direction of web movement and through the longitudinal axis of each roller, said rollers of said another plurality of rollers being positioned with spacing, on average, between longitudinal axes of adjacent ones of these rollers being in the range of 1.1 to 1.3 times the outer diameter of said adjacent ones of these rollers.

8. Apparatus as set forth in claim 7, in which the diameters of said rollers are in the range of 1½ to 3 inches.

9. Apparatus as set forth in claim 8, in which said rollers are in the range of 70 to 120 inches long.

10. Apparatus as set forth in claim 9, in which said rollers are constructed of steel.

11. Apparatus as set forth in claim 1, in which said weight means is in direct engagement with said web as it passes through said heating section.

References Cited

UNITED STATES PATENTS

| 3,560,304 | 2/1971 | Saunders | 156—470 |
| 782,558 | 2/1905 | Hahn | 156—470 |
| 2,949,151 | 8/1960 | Goldstein | 156—582 |
| 3,266,690 | 8/1966 | Goettsch | 156—471 |
| 3,434,901 | 3/1969 | Griffiths et al. | 156—470 |

FOREIGN PATENTS

| 145,710 | 6/1954 | Sweden | 156—470 |

BENJAMIN A. BORCHELT, Primary Examiner

H. J. TUDOR, Assistant Examiner